United States Patent [19]

Cook

[11] Patent Number: 4,501,667
[45] Date of Patent: Feb. 26, 1985

[54] PROCESS OF INHIBITING CORROSION OF METAL SURFACES AND/OR DEPOSITION OF SCALE THEREON

[75] Inventor: Barry Cook, Manchester, England

[73] Assignee: Ciba-Geigy Corporation, Ardsley, N.Y.

[21] Appl. No.: 582,213

[22] Filed: Feb. 21, 1984

[30] Foreign Application Priority Data

Mar. 3, 1983 [GB] United Kingdom ............... 8305933
Jun. 20, 1983 [GB] United Kingdom ............... 8316711

[51] Int. Cl.³ .............................................. C23F 11/00
[52] U.S. Cl. .................................... 210/700; 252/180; 422/7; 106/14.12
[58] Field of Search ...................... 252/389.22, 389.23; 106/14.12; 422/7; 210/700; 260/502.5 G

[56] References Cited

U.S. PATENT DOCUMENTS 2,174,019  9/1939  Sullivan ............................ 252/39.23
3,925,245  12/1975  Harris ............................. 252/389.22
4,055,591  10/1977  Schaf ............................... 210/700
4,250,107  2/1981  Sonmer ............................. 210/700

FOREIGN PATENT DOCUMENTS 2112370  7/1983  United Kingdom ............. 252/389.2

Primary Examiner—Sam Silverberg
Attorney, Agent, or Firm—Harry Falber

[57] ABSTRACT

Process for conditioning metal surfaces to inhibit their corrosion and/or to inhibit scale deposition thereon by treating said surfaces:

A. prior to contact with a corrosive or scaling environment, with
   (i) compound having the formula I:

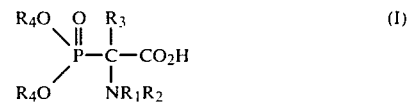

or a water-soluble salt (or partial ester or -salt) thereof, wherein $R_1$ and $R_2$ are the same or different and each is hydrogen, a $C_1$–$C_{12}$ straight- or branched chain alkyl group (optionally substituted by one or more hydroxy- and/or carboxyl groups and/or optionally interrupted by one or more oxygen atoms), a $C_3$–$C_{12}$ straight- or branched chain alkenyl group, a $C_7$–$C_{15}$ aralkyl group or —CH$_2$PO$_3$H$_2$, or $R_1$ and $R_2$, together with the nitrogen atom to which they are each bonded, may form an optionally-substituted heterocyclic ring; $R_3$ is hydrogen, a $C_1$–$C_{12}$ straight- or branched chain alkyl group or an optionally substituted $C_6$–$C_{10}$ aryl group; and $R_4$ is hydrogen or $C_1$–$C_4$ alkyl; and
   (ii) optionally a metal ion component (b) as hereinafter defined; and/or
B. during contact with an aqueous system capable of corroding a metal surface or of depositing scale thereon, with (a) a compound of formula I or a water-soluble salt (or partial salt) thereof; and optionally (b) a metal ion which enhances, synergistically, the metal conditioning effected, individually, by the compound of formula I and the metal ion.

19 Claims, No Drawings

PROCESS OF INHIBITING CORROSION OF METAL SURFACES AND/OR DEPOSITION OF SCALE THEREON

The present invention relates to a process of inhibiting corrosion of metal surfaces and/or deposition of scale thereon.

In the British Patent Application No. 2 112 370 A, we have described and claimed a method of treating an aqueous system to inhibit corrosion of metals, especially ferrous metals, in contact therewith and/or to inhibit scale deposition from the aqueous system, comprising adding to the aqueous system from 0.1 to 50000 ppm of 2-hydroxy-phosphonoacetic acid having the formula:

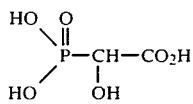

or a water-soluble salt thereof.

We have now found that certain 2-amino-phosphonoacetic compounds are also effective as corrosion inhibitors and/or scale deposition inhibitors, optionally in combination with metal ions, when added to aqueous systems in contact with metal surfaces, and when used to precondition metal surfaces prior to their contact with a corrosive or scaling environment.

Accordingly, the present invention provides a process for conditioning metal surfaces, especially ferrous, copper (or their alloys) surfaces, to inhibit their corrosion and/or to inhibit scale deposition thereon by treating said surfaces:

A. prior to contact with a corrosive or scaling environment, with (i) compound having the formula I:

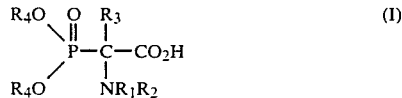

or a water-soluble salt (or partial ester or -salt) thereof wherein $R_1$ and $R_2$ are the same or different and each is hydrogen, a $C_1$–$C_{12}$ straight- or branched chain alkyl group (optionally substituted by one or more hydroxy- and/or carboxyl groups and/or optionally interrupted by one or more oxygen atoms), a $C_3$–$C_{12}$ straight- or branched chain alkenyl group, a $C_7$–$C_{15}$ aralkyl group or —$CH_2PO_3H_2$, or $R_1$ and $R_2$, together with the nitrogen atom to which they are each bonded, may form an optionally-substituted heterocyclic ring; $R_3$ is hydrogen, a $C_1$–$C_{12}$ straight- or branched chain alkyl group or an optionally substituted $C_6$–$C_{10}$ aryl group; and $R_4$ is $C_1$–$C_4$ alkyl or, preferably, hydrogen; and (iii) optionally a metal ion component (b) as hereinafter defined; and/or B. during contact with an aqueous system capable of corroding a metal surface or of depositing scale thereon, with (a) a compound of formula I or a water-soluble salt (or partial salt) thereof; and optionally (b) a metal ion which enhances, synergistically, the metal conditioning effected, individually, by the compound of formula I and the metal ion.

Treatments A and B can advantageously be applied by cathodically polarising the metal surface to be treated e.g. by any conventional impressed current technique (see e.g. Chapter 11, "Corrosion", L. L. Shreir, Newnes-Butterworth 1976).

Examples of $R_1$ and/or $R_2$ as $C_1$–$C_{12}$ straight- or branched chain alkyl groups (optionally hydroxy- or carboxy-substituted) include methyl, ethyl, n-propyl, isopropyl, n-butyl, isobutyl, t-butyl, n-pentyl, n-hexyl, n-octyl, n-nonyl, n-decyl, n-undecyl and n-dodecyl groups; 2-hydroxyethyl, 2-hydroxypropyl, 2-hydroxybutyl and 2,3-dihydroxypropyl groups; and carboxymethyl, 2-carboxyethyl, 2-carboxypropyl, 3-carboxybutyl and 1,2-dicarboxyethyl groups.

Examples of $R_1$ and/or $R_2$ as $C_3$–$C_{12}$ straight- or branched chain alkenyl groups include prop-2-enyl, n-but-2-enyl, 2-methyl-prop-2-enyl, n-pent-2-enyl, n-hex-2-enyl, n-hexa-2,4-dienyl, n-dec-10-enyl and n-dodec-12-enyl.

$C_7$–$C_{15}$-Aralkyl groups $R_1$ and/or $R_2$ include benzyl, α-methylbenzyl, α,α-dimethyl-benzyl, α- and β-phenylethyl, benzhydryl, or naphthylmethyl group.

When $R_1$ and $R_2$, together with the nitrogen atom to which they are each attached, form an optionally substituted heterocyclic ring, this may be e.g. a pyrrolidine, piperidine, morpholine or 2,5-dimethylmorpholine ring.

$C_1$–$C_4$ straight- or branched chain alkyl groups $R_3$ are e.g. methyl, ethyl, n-propyl, isopropyl, n-butyl or t-butyl groups; and optionally substituted $C_6$–$C_{10}$ aryl groups $R_3$ include phenyl, tolyl, xylyl, cumyl, butylphenyl and naphthyl groups.

Preferred compounds of formula I are those wherein $R_1$ and $R_2$ are hydrogen or $C_1$–$C_4$ alkyl, $R_3$ is hydrogen and $R_4$ is hydrogen.

Water-soluble salts or partial salts of compounds of formula I are e.g. alkali metal salts such as lithium, sodium and potassium salts, alkaline earth metal salts such as calcium, magnesium, strontium and barium; other metal ions such as cobaltous, ferrous, zinc, chromium, nickel, manganous, cadmium and ceric ions; ammonia; and $C_1$–$C_{20}$ alkylamine salts (optionally substituted with 1–6 hydroxy groups) e.g. methylamine, ethylamine, n-propylamine, trimethylene, triethylamine, n-butylamine, n-hexylamine, octylamine, ethanolamine and triethanolamine.

Most of the compounds of formula I are new and, as such, form part of the present invention. However, the compound of formula I wherein $R_1$, $R_2$, $R_3$ and $R_4$ are each hydrogen has been described by Nissan Chem. Ind. K.K. in JP 5408027.

A further subject matter of this invention are compounds having the formula I

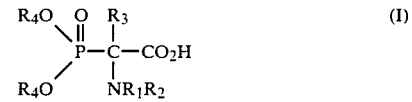

or water-soluble salts (or partial esters or -salts) thereof, wherein $R_1$ and $R_2$ are the same or different and each is hydrogen, a $C_1$–$C_{12}$ straight- or branched chain alkyl group optionally substituted by one or more hydroxy- and/or carboxyl groups and/or optionally interrupted by one or more oxygen atoms, a $C_3$–$C_{12}$ straight- or branched chain alkenyl group, a $C_7$–$C_{15}$ aralkyl group or —$CH_2PO_3H_2$, or $R_1$ and $R_2$, together with the nitrogen atom to which they are each bonded, may form an optionally-substituted heterocyclic ring; $R_3$ is hydrogen, a $C_1$–$C_{12}$ straight- or branched chain alkyl group or an optionally substituted $C_6$–$C_{10}$ aryl group; and $R_4$ is hydrogen or a straight- or branched chain $C_1$–$C_4$ alkyl group; provided that $R_1$, $R_2$, $R_3$ and $R_4$ are not each hydrogen.

The special meaning of $R_1$, $R_2$, $R_3$ and $R_4$ in form of examples is the same as given hereinbefore. The new compounds of formula I may be produced by methods known per se e.g. as outlined in the following reaction schemes:

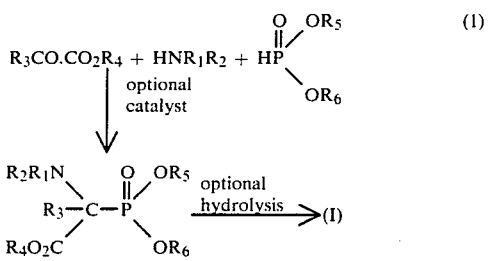

wherein $R_1$, $R_2$ and $R_3$ have their previous significance, $R_4$ is hydrogen or alkyl and $R_5$ and $R_6$ are the same or different and each is hydrogen, alkyl, aryl or aralkyl. Optional conventional hydrolysis techniques are employed when, in any intermediate ester, $R_4$, $R_5$ and $R_6$ are other than hydrogen. Any catalyst required may be a mineral acid e.g. HCl, an organic acid or a Lewis acid e.g. $AlCl_3$, $ZnCl_2$ or $BF_3$.

This general technique has been described by D. Redmore, J. Org. Chem. 43, 992 (1978);

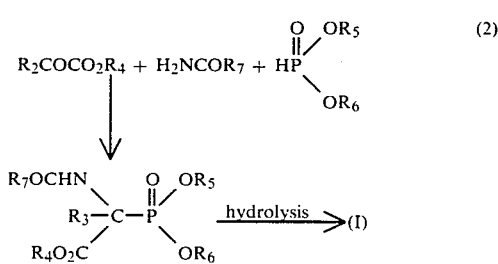

wherein $R_3$, $R_4$, $R_5$ and $R_6$ have their previous significance and $R_7$ is hydrogen, an alkyl, aralkyl or aryl radical.

This technique has been described by Oleksyszyn and Gruszeeka, Tetrahedron Letters 36, 3537 (1981);

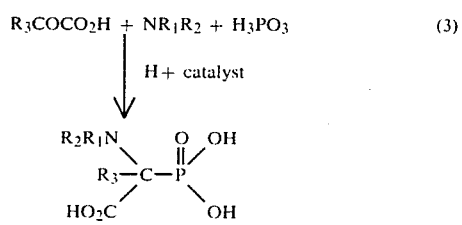

wherein $R_1$, $R_2$ and $R_3$ have their previous significance.

This method, which has previously only been employed using formaldehyde as carbonyl reactant, is substantially that described by Moedritzer and Irani, J. Org. Chem. 31, 1603 (1966);

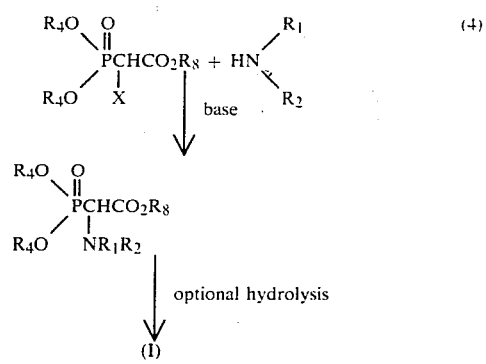

wherein $R_4$ has its previous significance, $R_8$ is H or $C_1$–$C_4$ alkyl and X is Cl or Br. Suitable bases are sodium- or potassium hydroxide, or tertiary amines such as triethylamine;

(5) Compounds of formula I in which $R_1$ and/or $R_2$ are —$CH_2PO_3H_2$ (phosphonomethylene) may be prepared by reacting a compound of formula I in which $R_1$ and $R_2$ are each hydrogen, with formaldehyde and phosphorous acid—as described by Moedritzer and Irani, J.Org.Chem. 31, 1603 (1966).

With respect to the treatments effected under heading (A), the metal surface to be treated may be contacted with e.g. an aqueous solution of compounds of formula I (or a water-soluble salt thereof) optionally in combination with a metal ion component especially a metal ion (b) which imparts synergistic corrosion inhibiting and/or scale inhibiting effects in combination with compounds of formula I.

Some typical applications of treatments (A) with the preferred application of impressed current techniques include temporary protection of metal surfaces to be exposed to corrosive atmospheres e.g. ambient atmospheres; pretreatment of metal surfaces to be subsequently painted; cotreatment in order to seal a phosphated metal surface; and formulating a paint containing compounds of formula I (or a salt thereof) and optionally metal ion component (b) and then applying this paint on to the metal surface to be conditioned, e.g. by spraying, brushing, dipping, or cathodically electrodeposition.

In each of these typical applications of treatments of type A, the metal surface e.g. a phosphated mild steel surface may be immersed in a solution of compounds of formula I (or a water-soluble salt thereof), optionally containing a metal ion component (b), as hereinbefore defined, or said solution may be painted or sprayed on to the said phosphated metal surface.

In treatments according to the invention under headings A or B, the metal ion component may be used as an independent metal salt or as the pre-formed salt of the compound of formula I, or as a combination of the two.

Suitable metal ion components (b) include, e.g. cobaltous, ferrous, barium, calcium, zinc, chromium, nickel, strontium, manganous, cadmium, ceric and magnesium ions. Some of these metal ions e.g. calcium and barium per se do not impart any corrosion inhibition or scale control.

The ratio of compounds of formula I (or water-soluble salt thereof) to any metal ion component (b), used in the corrosion- and/or scale-inhibiting combinations employed in the conditioning processes of invention.

may vary within wide limits e.g. from 100:1 to 1:100, more preferably from 10:1 to 1:10 parts by weight.

In practice, the amount of the combination of compounds of formula I and any metal ion which is used to treat the metal surface e.g. by adding the combination to added to the aqueous system in contact with the metal surface will vary depending upon the protective function which the combination is required to perform. For corrosion-inhibiting protective treatments, optionally in combination with scale inhibiting treatments, the amount of said combination added to the aqueous system is conveniently within the range of from 0.1 to 50,000 ppm (or 0.00001 to 5% by weight) preferably from 1 to 500 ppm (or 0.0001 to 0.5% by weight), based on the aqueous system. For solely anti-scale purposes, the amount of said combination used is conveniently from 1 to 200 ppm, preferably 1 to 30 ppm, based on the aqueous system.

With respect to aqueous systems which may be treated according to the present invention, of particular interest with respect to combined corrosion inhibition and anti-scale treatments are cooling water systems, steam generating systems, sea-water evaporators, hydrostatic cookers, gas scrubbing systems, closed circuit heating systems, aqueous-based refrigeration systems and down-well systems; for corrosion inhibition treatments alone, aqueous systems of particular interest include aqueous machining fluid formulations (e.g. for use in boring, milling, reaming, broaching, drawing, spinning, turning, cutting, sawing, grinding, and tread-cutting operations or in non-cutting shaping in drawing or rolling operations), aqueous scouring systems, engine coolants including aqueous glycol antifreeze systems, water/glycol hydraulic fluids; and aqueous based polymer surface-coating systems or solvent-based polymer systems e.g. those containing tetrahydrofuran, ketones or alkoxyalkanols.

The synergistic inhibitor combination used according to the invention may be used alone or in combination with other compounds known to be useful in the treatment of aqueous systems.

In the treatment of systems which are completely aqueous, such as cooling water systems, air-conditioning systems, steam-generating systems, sea-water evaporatory systems, hydrostatic cookers, and closed circuit heating or refrigerant systems, further corrosion inhibitors may be used such as, for example, water soluble zinc salts; phosphates, polyphosphates; phosphonic acids and their salts, for example acetodiphosphonic acid, nitrilotris methylene phosphonic acid and methylamino dimethylene phosphonic acid; 2-hydroxyphosphonoacetic acid or other phosphonocarboxylic acids and their salts, for example, those described in German Offenlegungsschrift No. 26 32 774, 2-phosphonobutane-1,2,4-tricarboxylic acid and those disclosed in GB 1 572 406; chromates for example, sodium chromate; nitrates, for example sodium nitrate, nitrites e.g. sodium nitrite; molybdates e.g. sodium molybdate; silicates e.g. sodium silicate; benzotriazole, bis-benzotriazole or copper deactivating benzotriazole or tolutriazole derivatives or their Mannich base derivatives; N-acyl sarcosines; N-acylamino diacetic acids, ethanolamines; fatty amines; and polycarboxylic acids, for example, polymaleic acid and polyacrylic acid, as well as their respective alkali metal salts, copolymers or maleic anhydride, copolymers of acrylic acid, and substituted derivatives of polymaleic and polyacrylic acids and their copolymers.

Moreover, in such completely aqueous systems, the inhibitor used according to the invention may be used in conjunction with further dispersing and/or threshold agents e.g. polymerised acrylic acid (or its salts), phosphino-polycarboxylic acids (as described and claimed in British Pat. No. 1 458 235), hydrolysed polyacrylonitrile, polymerised methacrylic acid and its salts, polyacrylamide and co-polymers thereof from acrylic and methacrylic acids, lignin sulphonic acid and its salts, tannin, naphthalene sulphonic acid/formaldehyde condensation products, starch and its derivatives, cellulose, acrylic acid/lower alkyl hydroxyacrylate copolymers such as those described in U.S. Pat. No. 4,029,577, sulphonated styrene/maleic anhydride copolymers, styrene/maleic anhydride copolymers and sulphonated styrene homopolymers such as those described in the U.S. Pat. No. 4,374,733 and combinations thereof. Specific threshold agents, such as for example, 2-phosphonobutane-1,2,4-tricarboxylic acid, acetodiphosphonic acid, hydrolysed polymaleic anhydride and its salts, alkyl phosphonic acids, 1-aminoalkyl-1,1-diphosphonic acids and their salts, and alkali metal polyphosphates, may also be used.

Precipitating agents such as alkali metal ortho-phosphates, carbonates; oxygen scavengers such as alkali metal sulphites and hydrazines; sequestering agents such as nitrilotriacetic acid and its salts; antifoaming agents such as silicones e.g. polydimethylsiloxanes, distearylsebacamide, distearyl adipamide and related products derived from ethylene oxide and/or propylene oxide condensations, in addition to fatty alcohols, such as capryl alcohols and their ethylene oxide condensates; and biocides e.g. amines, quaternary ammonium compounds, chlorophenols, sulphur-containing compounds such as sulphones, methylene bis thiocyanates and carbamates, isothiazolones, brominated propionamides, triazines, phosphonium compounds, chlorine and chlorine-release agents and organometallic compounds such as tributyl tin oxide, may be used. If the system to be treated by the method of the invention is not completely aqueous e.g. an aqueous machining fluid formulation, it may be e.g. a water dilutable cutting or grinding fluid.

The aqueous machining fluid formulations of the invention may be e.g. metal working formulations. By "metal working" we mean "reaming, broaching, drawing, spinning, cutting, grinding, boring, milling, turning, sawing, non-cutting shaping or rolling". Examples of water-dilutable cutting or grinding fluids into which the corrosion inhibiting combination may be incorporated include:

(a) Aqueous concentrates of one or more corrosion inhibitors, and optionally one or more anti-wear additives, used at dilutions of 1:50 to 1:100, which are usually employed as grinding fluids;

(b) Polyglycols containing biocides, corrosion inhibitors and anti-wear additives which are used at dilutions of 1:20 to 1:40 for cutting operations and 1:60 to 1:80 for grinding;

(c) Semi-synthetic cutting fluids similar to (b) but containing in addition 10 to 25% oil with sufficient emulsifier to render the water diluted product translucent;

(d) An emulsifiable mineral oil concentrate containing, for example, emulsifiers, corrosion inhibitors, extreme pressure/anti-wear additives, biocides, antifoaming agents, coupling agents etc.; they are generally diluted from 1:10 to 1:50 with water to a white opaque emulsion;

(e) A product similar to (d) containing less oil and more emulsifier which on dilution to the range 1:50 to 1:100 gives a translucent emulsion for cutting or grinding operations.

For those partly-aqueous systems in which the aqueous system component is an aqueous machining fluid formulation the inhibitor of the invention may be used singly, or in admixture with other additives e.g. known further corrosion inhibitors and/or extreme-pressure additives.

Examples of other corrosion inhibitors which may be used in these aqueous systems, in addition to the inhibitor composition used according to the invention, include the following groups:

(a) Organic acids, their esters or ammonium, amine, alkanolamine and metal salts, for example, benzoic acid, p-tert-butyl benzoic acid, disodium sebacate, triethanolamine laurate, iso-nonanoic acid, triethanolamine salt of (p-toluene sulphonamido caproic acid), triethanolamine salt of benzene sulphonamido caproic acid, triethanolamine salts of 5-ketocarboxylic acid derivatives as described in European Patent Application No. 41927, sodium N lauroyl sarcosinate or nonyl phenoxy acetic acid;

(b) Nitrogen-containing materials such as the following types: fatty acid alkanolamides; imidazolines, for example, 1-hydroxy-ethyl-2-oleyl-imidazolines; oxazolines; triazoles, for example, benzotriazoles; or their Mannich base derivatives; triethanolamines, fatty amines; and inorganic salts, for example, sodium nitrate;

(c) Phosphorus-containing materials such as the following types: amine phosphates, phosphonic acids or inorganic salts, for example, sodium dihydrogen phosphate or zinc phosphate;

(d) Sulphur containing compounds such as the following types: sodium, calcium or barium petroleum sulphonates, or heterocyclics, for example, sodium mercaptobenzothiazole.

Nitrogen-containing materials, particularly triethanolamine, are preferred.

Examples of extreme pressure additives which may be present in the systems treated according to the present invention include sulphur and/or phosphorus and/or halogen containing materials, for instance, sulphurised sperm oil, sulphurised fats, tritolyl phosphate, chlorinated paraffins or ethoxylated phosphate esters.

When triethanolamine is present in the aqueous systems treated according to the present invention, it is preferably present in an amount such that the ratio of inhibitor composition to triethanolamine is from 2:1 to 1:20.

The partly-aqueous systems treated by the method of the present invention may also be aqueous surface-coating compositions e.g. emulsion paints and aqueous powder coatings for metallic substrates.

The aqueous surface-coating composition may be e.g. a paint such as a styrene-acrylic copolymer emulsion paint, a resin, latex, or other aqueous based polymer surface-coating system, to coat a metal substrate. The inhibitor composition used according to the invention may be employed to prevent flash rusting of the metal substrate during application of the surface coating and to prevent subsequent corrosion during use of the coated metal.

In aqueous surface-coating compositions treated by the method of the invention the inhibitor composition may be used singly, or in admixture with other additives e.g. known corrosion inhibitors, biocides, emulsifiers and/or pigments.

The further known corrosion inhibitors which may be used are e.g. those of classes (a), (b), (c) and (d) hereinbefore defined.

Examples of biocides which may be used in these aqueous systems, in addition to the compound of formula I, include the following:

Phenols, and alkyl- and halogenated phenols, for example pentachlorophenol, o-phenylphenol, o-phenoxyphenol and chlorinated o-phenoxyphenol, and salicylanilides, diamines, triazines and organometallic compounds such as organomercury compounds and organotin compounds.

Examples of pigments which may be used in these aqueous systems, in addition to the compound of formula I, include titanium dioxide, zinc chromate, iron oxide and organic pigments such as the phthalocyanines.

The following Examples further illustrate the present invention.

EXAMPLE 1

A solution of 16.3 parts by weight of diethylamine hydrochloride, 16.6 parts by weight or orthophosphorous acid, and 29.6 parts by weight of glyoxylic acid (50% aqueous solution) in 50 parts by volume of 18% hydrochloric acid is heated to reflux for 18 hours. Volatile material is then removed by vacuum distillation and the residual oil triturated with acetone to remove impurities. In this way, there are obtained 28 parts by weight of 2-diethylaminophosphonoacetic acid hydrochloride monohydrate having the following analysis by weight:

Found: P, 11.54%; $C_6H_{12}NO_5P \cdot HCl \cdot H_2O$ requires: P, 11.67%.

Additionally $^{31}P$-nmr shows an absorption at 15.8 ppm, ($J_{P-CH}=18H_3$) downfield from $H_3PO_4$ (in water).

EXAMPLE 2

A solution of 11.8 parts by weight of acetamide, 16.4 parts by weight of orthophosphorus acid in 40 parts by volume of acetic anhydride are heated with stirring to 45° C. To this solution is added, portionwise, 22.2 parts by weight of glyoxylic acid hydrate over 15 minutes. The reaction temperature increases to 80° C., during the addition and this temperature is maintained by external heating for a further 3 hours. The acetic anhydride is removed by distillation, in vacuo, and the viscous residue dissolved in 100 parts by volume concentrated hydrochloric acid. This solution is heated to reflux for 4 hours, then evaporated to dryness to give a brown crystalline solid, which on dissolution in 600 parts by volume of 60% aqueous methanol, followed by addition of propylene oxide, gives 9.3 parts by weight of 2-aminophosphono-acetic acid monohydrate melting at 195° C. with decomposition and having the following elemental analysis by weight:

Found: C, 13.92; H, 4.57; N, 7.97; P, 17.79%; $C_2H_6NO_5P \cdot H_2O$ requires: C, 13.88%; H, 4.66%; N, 8.10%; P, 17,90%.

EXAMPLE 3

A solution of 9.2 parts by weight of glyoxylic acid hydrate, 8.7 parts by weight of morpholine, and 8.2 parts by weight of orthophosphorous acid in 100 parts by volume of 18% hydrochloric acid are treated in a like manner to Example 1 to give 24.5 parts by weight of 2-N-morpholinophosphonoacetic acid. $^{31}P$-nmr spectrum (in water) shows an absorption at 13.8 ppm downfield from $H_3PO_4$ ($J_{P-CH}=18H_3$).

EXAMPLE 4

In a like manner to Example 1, a solution of sarcosine (8.9 parts by weight), orthophosphorous acid (8.2 parts by weight) in 100 parts by weight of 18% hydrochloric acid is reacted to give, on evaporation, 25.8 parts by weight of 2-(N-methyl-N-carboxymethylamino)phosphonoacetic acid hydrochloride as a pale yellow amorphous solid having a $^{31}$P-nmr signal at 13.3 ppm downfield from $H_3PO_4$ in water ($J_{P-CH}=18H_3$).

EXAMPLE 5

A solution of 2-aminophosphonoacetic acid (7.8 parts by weight), p-formaldehyde (4.5 parts by weight) and ortho-phosphorous acid (8.2 parts by weight) in 40 parts by volume of concentrated hydrochloric acid is heated at reflux for 8 hours. Removal of the solvent by vacuum distillation at 90° C./12 mm Hg gives 16.2 parts by weight of a dark red viscous oil whose $^{31}$P-nmr spectrum is consistent with the structure for 2-(N,N-bisphosphonomethyleneamino)phosphonoacetic acid having two peaks at 9.7 ppm downfield (triplet J=13 Hz) and 14.6 ppm downfield (doublet J=18 Hz) in relation to $H_3PO_4$.

EXAMPLE 6

Corrosion inhibitor activity of the active compounds of formula I is demonstrated in the following way by the Aerated Solution Bottle Test and using a standard corrosive water made up as follows:

20 g $CaSO_4.2H_2O$
15 g $MgSO_4.7H_2O$
4.6 g $NaHCO_3$
7.7 g $CaCl_2.6H_2O$
205 l Distilled water Mild steel coupons, 5 cm×2.5 cm, are scrubbed with pumice, immersed for one minute in hydrochloric acid and then rinsed, dried and weighed.

The desired proportion of additive combination is dissolved in 200 ml of standard corrosive water. Two steel coupons are suspended in the solution, and the whole is stored in a closed bottle in a thermostat at 40° C. During the storage period, air is passed into the solution at 500 ml/minute, the passage of the air being screened from the steel coupon; any water losses by evaporation are replaced with distilled water.

After 64 hours, the steel coupons are removed, scrubbed without pumice, immersed for one minute in hydrochloric acid inhibited with 1% by weight of hexamine and then rinsed, dried and reweighed. A certain loss in weight will have occurred. A blank test i.e. immersion of mild steel specimens in the test water in the absence of any potential corrosion inhibitor, is carried out with each series of tests. The corrosion rates are calculated in milligrams of weight loss/sq. decimeter/day (m.d.d.) but for convenience the results are shown as percentage protection, which is defined as follows:

% Protection =

$$\frac{\text{Corrosion rate for blank (in } m.d.d) - \text{corrosion rate for sample}}{\text{Corrosion rate for blank (in } m.d.d.)} \times 100$$

The results obtained in a series of tests using a compound of formula I as corrosion inhibitor are set out in Table I.

TABLE I

Mild steel corrosion inhibition of compounds of formula I in a standard corrosive water.

| Product of Example | Concentration (ppm) | % Corrosion inhibition |
|---|---|---|
| 1 | 100 | 91 |
| 2 | 100 | 99 |
| 4 | 200 | 95 |

EXAMPLE 7

Treshold Test for Calcium Carbonate

The following solutions (a), (b) and (c) are prepared:

(a) Calcium nitrate solution 1.470 grams of calcium nitrate tetrahydrate are dissolved in de-ionised water and the solution is made up to 1 liter;

(b) Sodium carbonate solution 0.646 gram of sodium carbonate is dissolved in deionised water and the solution is made up to 1 liter.

(c) Solution of 2-amino-phosphonoacetic acid 2-amino-phosphonoacetic acid monohydrate as obtained in Example 2 is dissolved in water to give a solution containing 1000 ppm of active ingredient.

50 mls. of the calcium nitrate solution are placed in a 120 g glass bottle fitted with a screw cap. To this solution is added that volume of solution (c) required to produce a concentration of 2-amino-phosphonoacetic acid monohydrate of 5 ppm, 7.5 ppm or 10 ppm, respectively, in the final volume (100 ml) of test solution (e.g. 1.0 ml of 0.1% of solution (c) produce a concentration of 10 ppm of 2-amino-phosphonoacetic acid monohydrate in the test solution). 50 ml of solution (b) are added and the mixture is shaken. The test solution is stored in a constant temperature bath, maintained at 25° C., for 24 hours.

25 mls. of the test solution are withdrawn, a crystal of Patton and Reader's Reagent [2-hydroxy-1-(2-hydroxy-4-sulpho-1-naphthylazo)-3-naphthoic acid] is added, followed by two pellets of sodium hydroxide. The resulting solution is titrated with a standard 0.01M solution of ethylene-diamine tetra-acetic acid di-sodium salt.

The results, as set out in the following Table 4, are expressed as % inhibition of precipitation of calcium carbonate relative to a blank titre (i.e. one containing no 2-amino-phosphonoacetic acid).

$$\% \text{ inhibition} = \frac{(\text{Titre} - \text{blank titre})}{(7.78 - \text{blank titre})} \times 100$$

7.78 is the maximum possible titration for 100% inhibition.

TABLE 4

| Example | Inhibitor Structure | % Inhibition of precipitation at additive level of | | |
|---|---|---|---|---|
| | | 5 ppm | 7.5 ppm | 10 ppm |
| 7 | $H_2O_3PCHCO_2H$<br>\|<br>$NH_2$ | 95 | 96 | 97 |

What is claimed is:

1. Process for conditioning metal surfaces to inhibit their corrosion and/or to inhibit scale deposition thereon, by treating said surfaces:

(A) during contact with an aqueous system capable of corroding said metal surface or of depositing scale thereon, with (i) a compound having the formula (I)

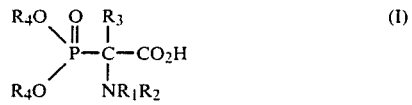

or a water-soluble salt (or partialester or -salt) thereof, wherein $R_1$ and $R_2$ are the same or different and each is hydrogen, a $C_1$-$C_{12}$ straight- or branched chain alkyl group (optionally substituted by one or more hydroxy- and/or carboxyl groups and/or optionally interrupted by one or more oxygen atoms), a $C_3$-$C_{12}$ straight- or branched chain alkenyl group, a $C_7$-$C_{15}$ aralkyl group, or —$CH_2PO_3H_2$, or $R_1$ and $R_2$, together with the nitrogen to which they are each bonded, may form an optionally-substituted heterocyclic ring; $R_3$ is hydrogen, a $C_1$-$C_{12}$ straight- or branched chain alkyl group or an optionally substituted $C_6$-$C_{10}$ aryl group; and $R_4$ is hydrogen or a $C_1$-$C_4$ alkyl group; and optionally (ii) a metal ion (B) during contact with an aqueous system capable of corroding a metal surface or of depositing scale thereon, with (a) a compound of formula I or a water-soluble salt (or partial salt) thereof; and optionally (b) a metal ion which enhances, synergistically, the metal conditioning effected, individually, by the compound of formula I and the metal ion.

2. Process according to claim 1 wherein $R_1$ and $R_2$ are each hydrogen or $C_1$-$C_4$ alkyl and $R_3$ and $R_4$ are each hydrogen.

3. Process according to claim 1 wherein ferrous, copper, (or their alloys) surfaces are treated.

4. Process according to claim 1 wherein the metal surface to be treated is cathodically polarised.

5. A process according to claim 1 wherein the aqueous system is a completely aqueous system and is a cooling water system, an air conditioning system, a steam generating system, a sea-water evaporator, a hydrostatic cooker, a gas scrubbing system or a closed circuit heating or refrigerant system and the inhibitor combination formula I and metal ion, is used in conjunction with one or more of a further corrosion inhibitor, a dispersing and/or threshold agent, a precipitating agent, an oxygen scavenger, a sequestering agent and an anti-foaming agent and a biocide.

6. A process according to claim 1 wherein the partly aqueous system in an aqueous surface coating composition and the inhibitor combination, formula I and metal ion, is used in conjunction with one or more of a corrosion inhibitor, a biocide, an emulsifier and/or a pigment.

7. A process according to claim 1 wherein the aqueous system is only partly aqueous and is an aqueous machining fluid and the inhibitor combination, formula I and metal ion, is used in conjunction with one or more of a further corrosion inhibitor and/or an extreme pressure additive.

8. Process according to claim 1 wherein the metal surface, is contacted with, metal ion selected from, one or more of cobalt, ferrous, barium, calcium, zinc, chromium, nickel, strontium, manganous, cadmium, ceric or magnesium ions.

9. Process according to claim 1 wherein the ratio of compounds of formula I (or water-soluble salt thereof) to any metal ion is within the range of from 100:1 to 1:100.

10. Process according to claim 9 wherein the ratio of compounds of formula I (or water-soluble salt thereof) to metal ion is from 10:1 to 1:10.

11. A process according to claim 1 wherein the inhibitor combination, formula I and metal ion, is used in an aqueous system, in contact with a metal surface which requires corrosion-inhibiting and optionally scale inhibiting protective treatments, in an amount of from 1 to 500 ppm, based on the aqueous system.

12. A process according to claim 11 wherein the inhibitor combination, formula I and metal ion, is added in an amount of from 1 to 100 ppm based on the aqueous system.

13. A process according to claim 1 wherein the inhibitor combination, formula I and metal ion, is added to an aqueous system, in contact with a metal surface which requires only a scale-inhibition treatment, in an amount of from 1–200 ppm, based on the aqueous system.

14. A process according to claim 13 wherein the inhibitor combination, formula I and metal ion, is added to the aqueous system in an amount of from 1 to 30 ppm, based on the aqueous system.

15. A process according to claim 13 wherein the aqueous system is in contact with a metal surface which requires only a corrosion inhibition system and is an aqueous machining fluid formulation, an aqueous scouring system, an aqueous glycol antifreeze system, a water/glycol hydraulic fluid or a water-based surface coating composition.

16. A process according to claim 15 wherein the aqueous machining fluid formulation is a water-dilutable cutting- or grinding fluid.

17. A process according to claim 1 wherein the aqueous system is in contact with a metal surface which requires a combined corrosion inhibition- and anti-scale treatment and is a cooling water system, a steam generating system, a sea-water evaporator, a hydrostatic cooker, a gas scrubbing system, a closed circuit heating system, an aqueous-based refrigeration system or a down-well system.

18. A process according to claim 7 wherein the further corrosion inhibitor is triethanolamine.

19. A process according to claim 18 wherein triethanolamine is present in an amount such that the ratio of inhibitor combination, formula I and metal ion, to triethanolamine is from 2:1 to 1:20.

* * * * *